(12) United States Patent
Mandai et al.

(10) Patent No.: US 6,231,679 B1
(45) Date of Patent: May 15, 2001

(54) METHOD AND APPARATUS FOR REMOVING DUST FROM BASE FILM

(75) Inventors: Toshihiro Mandai; Hideaki Takekuma; Norio Shibata, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/116,464

(22) Filed: Jul. 16, 1998

(30) Foreign Application Priority Data

Jul. 16, 1997 (JP) .................................................. 9-191304

(51) Int. Cl.[7] ............................... B08B 7/00; B08B 7/04
(52) U.S. Cl. ..................................... 134/6; 134/9; 134/10; 134/15
(58) Field of Search ................................. 134/64, 64 R, 134/122 R, 111, 6, 9, 10, 15; 15/93.1, 100, 102; 427/129, 299; 118/72, 73, 410, 419

(56) References Cited

U.S. PATENT DOCUMENTS

| 4,518,637 | * | 5/1985 | Takeda et al. . | |
| 4,887,623 | * | 12/1989 | Sugiyama et al. | 134/64 R |
| 4,944,808 | * | 7/1990 | Sugiyama et al. | 134/15 |
| 5,306,523 | * | 4/1994 | Shibata | 427/129 |
| 5,569,494 | * | 10/1996 | Suzuki et al. | 427/129 X |

FOREIGN PATENT DOCUMENTS

| 1-242354 | * | 9/1989 | (JP) . |
| 550419 | | 7/1993 | (JP) . |

* cited by examiner

*Primary Examiner*—Alexander Markoff
(74) *Attorney, Agent, or Firm*—Sughrue, Mion, Zinn, Macpeak & Seas, PLLC

(57) ABSTRACT

A method and apparatus for removing dust from a base film effectively so that electrostatic charges of the base film are reduced while the cleaning effect is kept high. After a cleaning solvent is applied onto one surface of a base film by a precoater, a rod member is pressed against the base film while the cleaning solvent remains on the base film, so that deposits on the base film are separated and scraped together with the cleaning solvent from the base film by the rod member. Just after the deposits are scraped from the base member, a solvent, of the same kind as the cleaning solvent or a mixture of a solvent of the same kind as the cleaning solvent and an additive mixed thereto, is applied onto the base film while the surface of the base film coated with the cleaning solvent is not exposed to an atmospheric air space.

2 Claims, 4 Drawing Sheets

METHOD AND APPARATUS FOR REMOVING DUST FROM BASE FILM

BACKGROUND OF THE INVENTION

The present invention relates to a method and apparatus for removing foreign matter, dust, or the like, deposited on a surface of a flexible support (hereinafter referred to as "base film"). That is, the invention relates to a method and apparatus for removing dust from a base film.

The terminology "base film" used in the present invention generally means a flexible belt-like member formed from: a film of resin, such as polyethylene terephthalate, polyethylene-2,6-naphthalate, cellulose diacetate, cellulose triacetate, cellulose acetate propionate, polyvinyl chloride, polycarbonate, polyimide, polyamide, etc., and having a thickness in a range of from the order of microns to the order of tens of microns; paper coated or laminated with α-polyolefin, such as polyethylene, polypropylene, ethylenebutene copolymer, etc., and having 2 to 10 carbons; foil of metal such as aluminum, copper, tin, etc.; or means a belt-like member in which a pretreated layer is formed on a surface of the above-mentioned flexible belt-like member used as a base material.

Further, the aforementioned base film is treated such that a coating composition, in accordance with the purpose of use, such as a photographic light-sensitive coating composition, a magnetic coating composition, a surface protection coating composition, an antistatic coating composition, a lubricating coating composition, or the like, is applied onto either one or both of the surfaces of the base film, and the thus coated base film is dried and cut into pieces of a desired width and a desired length. Typically the base film may be used for various types of photographic films, sheets of photographic printing paper, magnetic recording media such as magnetic tapes, and so on.

Generally, the base film used for various purposes as described above is subjected to a so-called dust removing treatment, as a pretreatment before the coating treatment, for forcedly removing dust, or the like, deposited on the surface of the base film. As a well-known dust removing method, there are a method of pressing nonwoven fabric, a blade, or the like, against the surface of the base film and a method of blowing out air, having a high-degree of cleanliness, to the base film while ultrasonically or speedily vibrating the air, so that deposits are separated by the air from the surface of the base film and led to a nearby provided suction port. Both of these methods are of the dry type. On the other hand, as a wet type base film dust removing method, known are a method in which a base film is introduced into a cleaning tank and deposits are separated by ultrasonic vibration, or the like, in the cleaning tank, and a method in which a cleaning solution is supplied to a base film, and air is blown and sucked at a high speed to and from the base film. These cleaning methods are effective for removing relatively large-size deposits not smaller than the order of tens of microns or deposits of relatively weak adhesion, but these cleaning methods are almost ineffective for removing small-size deposits or deposits of relatively strong adhesion.

In order to solve those problems, a method has been proposed as disclosed in Japanese Patent Examined Publication No. Hei-5-50419. The proposed method comprises the steps of: applying a solvent (hereinafter a solvent for a concerning purpose is referred to as a "cleaning solvent") onto a base film; and pressing a rod member against the base film which carries the solvent remaining thereon while the rod member is being rotated in a direction reserve to the running direction of the base film so that deposits on the base film are separated and scraped. When the rod member rotating in a direction reverse to the running direction of the base film is pressed against the base film after the cleaning solvent is applied onto the base film, not only a small gap is formed between the base film and the rod member so that deposits which are larger in size than this gap are prevented from passing through the gap but also shearing force is applied on the deposits through the solvent, and the dust-removing effect can be recognized also for smaller-size deposits or deposits of relatively strong adhesion.

On the other hand, with the advance of the density of magnetic recording media, the level of requirements for removal of deposits on the surface of a base film has become further strick so that a method having a higher dust-removing effect has become in demand.

In the case of the aforementioned method of pressing a rod member which is rotating in a direction reverse to the running direction of the base film, for example, the following means is considered as means for improving the dust-removing effect. That is, the curvature of the rod member is reduced to heighten the surface pressure between the rod member and the base film and further reduce the gap between the base film and the rod member so that smaller deposits can be prevented from passing through the gap and strong shearing force can be given to the deposits through the solvent.

Further, as another cleaning method, a method has been proposed as disclosed in Japanese Patent Unexamined Publication No. Sho-62-65872. In the proposed method, a blade having a sharp edge is provided, instead of the rod member rotating in the direction reverse to the running direction of the base film, to heighten the cleaning effect.

These dust removing methods including the step of giving high shearing force, however, have a problem that floating dust, or the like, is again deposited on the base film because the base film is electrostatically charged after the dust removing step. Although a countermeasure of disposing a general destaticizer after the dust removing step, or the like, was generally taken to solve this problem, there arose a new problem that electrostatic charges can not be removed perfectly by such a general destaticizer as the quantity of electrostatic charges increases.

SUMMARY OF THE INVENTION

Taking the problems in the prior art into consideration, the present invention has an object to provide a method and apparatus for removing dust from a base film effectively in which the electrostatic charges of the base film are reduced while the dust-removing effect is kept high.

In order to achieve the above object, according to an aspect of the present invention, provided is a method for removing dust from a base film in a magnetic recording medium producing process in which, after a cleaning solvent is applied onto one surface of the base film, a solvent scraping means is pressed against the one surface of the base film while the cleaning solvent remains on the one surface of the base film to thereby separate and scrape deposits together with the solvent from one surface of the base film, the method comprising the steps of applying a solvent of the same kind as the cleaning solvent or a mixture of a solvent of the same kind as the cleaning solvent and an additive mixed thereto onto the one surface of the base film while the one surface of the base film coated with the cleaning solvent is not exposed to an atmospheric air space just after the cleaning solvent and the deposits are scraped from the base film.

In the method for removing dust from a base film, the solvent of the same kind as the cleaning solvent or the mixture of the solvent of the same kind as the cleaning solvent and the additive mixed thereto is applied at least in an amount in a range of from 5 to 15 cc/m$^2$, preferably in an amount in a range of from 10 to 15 cc/m$^2$ without interposition of any atmospheric air space just after the solvent scraping means. This is because the antistatic effect cannot be expected if the above amount is smaller than 5 cc/m$^2$ and because drying load becomes large if the above amount is larger than 15 cc/m$^2$.

In order to achieve the above object according to another aspect of the present invention, provided is an apparatus for removing dust from a base film, comprising:

a first coating means for applying a cleaning solvent onto one surface of a base film which is being conveyed;

a solvent scraping means disposed in a downstream side of the first coating means in the direction of conveyance of the base film and pressed against the one surface of the base film to scrape off the cleaning solvent together with deposits on the one surface of the base film; and a second coating means disposed just after the solvent scraping means in the direction of conveyance of the base film without interposition of any space and for applying a solvent of the same kind as the cleaning solvent or a mixture of a solvent of the same kind as the cleaning solvent and an additive mixed thereto onto the one surface of the base film.

DESCRIPTION OF THE PREFERRED EMBODIMENTS

Embodiments of the present invention will be described below in detail with reference to the accompanying drawings.

Figure 1:
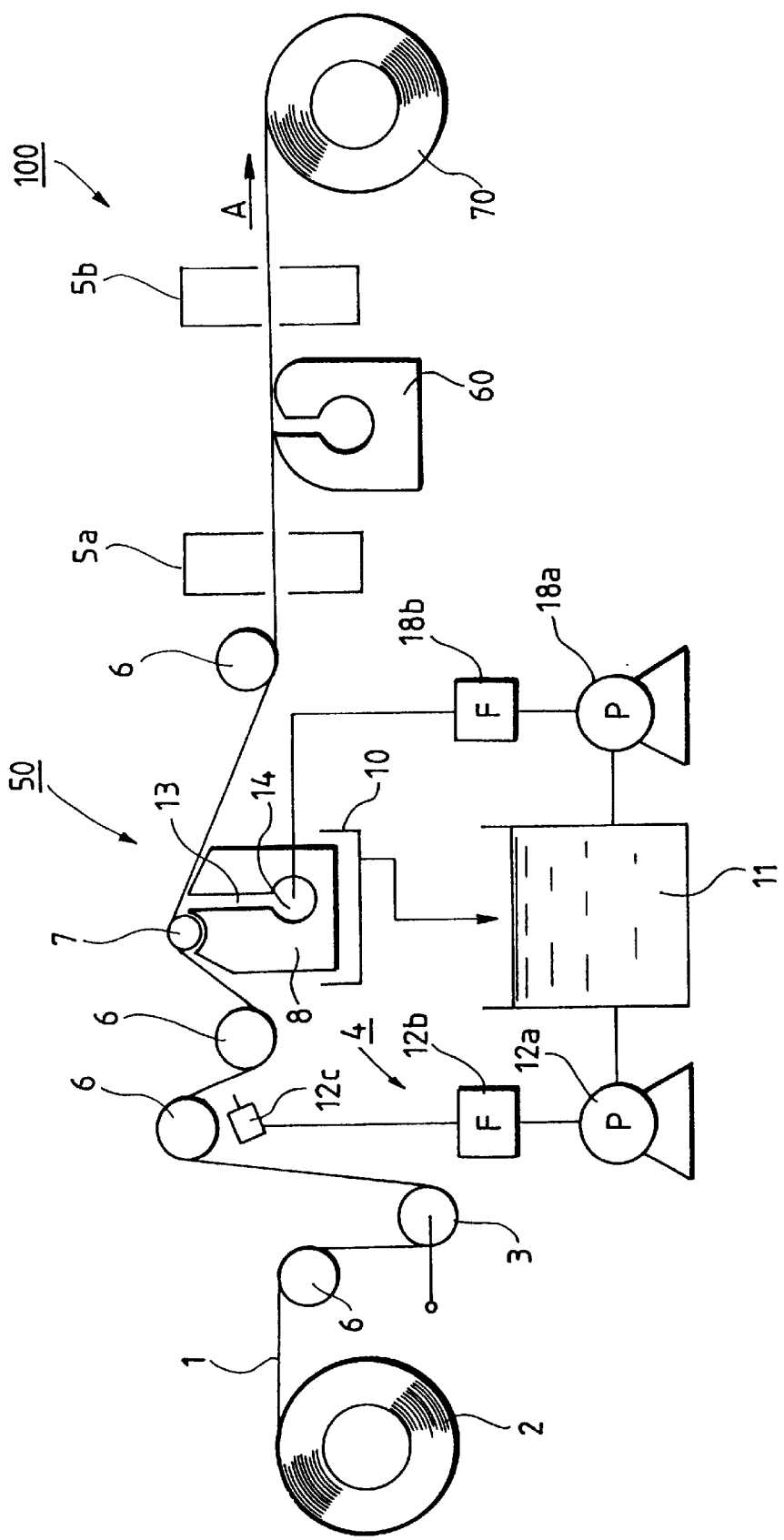
FIG. 1 is a schematic configuration view of a magnetic recording medium producing equipment using a dust removing apparatus and method as an embodiment of the present invention.

FIG. 1 is a schematic configuration view of a magnetic recording medium producing equipment to which a method and apparatus for removing dust from a base film is applied as an embodiment of the present invention.

As shown in FIG. 1, the magnetic recording medium producing equipment 100 is constituted by a roll-shaped base film 1, a supply device 2 for supplying the base film 1 continuously, a plurality of guide rollers 6 for guiding the conveyance of the base film 1, a tension roller 3 for giving suitable tension to the running base film 1, a dust removing apparatus 50 for removing dust from the base film 1, a first drying portion 5a for drying the base film 1 which is made wet by dust removal, a magnetic-dispersion solution applicator 60 for applying a magnetic dispersion solution onto the dried base film 1, a second drying portion 5b for drying the applied magnetic dispersion solution and a take-up device 70 for taking up the dried base film 1 into the form of a roll. In the aforementioned configuration, the base film 1 supplied from the supply device 2 is laid over the plurality of guide rollers 6 and conveyed in the predetermined direction while suitable tension is given to the base film 1 through the tension roller 3.

The dust removing apparatus 50 for removing dust from the base film 1 is constituted by a precoater 4 as a first coating means for applying a cleaning solvent 15 onto one surface of the base film 1, a rod member 7 disposed in the downstream side of the precoater 4 in the direction of conveyance of the base film 1 and provided for scraping a large part of the cleaning solvent 15 together with deposits on the base film 1 while the cleaning solvent 15 remains without volatilization from the surface of the base film 1, and a slit 13 as a second coating means disposed just after the rod member 7 in the direction of conveyance of the base film 1 so that the surface of the base film carrying the cleaning solvent applied thereon is not exposed to an atmospheric air space and provided for applying a solvent of the same kind as the cleaning solvent or a mixture of a solvent of the same kind as the cleaning solvent and an additive mixed thereto onto the base film 1.

As the cleaning solvent, it is possible to use a material such as methyl ethyl ketone, butyl acetate, cyclohexane, or toluene, or a mixture solution of those materials, or a mixtures containing those materials or the above-mentioned mixture solution as main component and various binder added thereto. The viscosity of the cleaning solvent should be not higher than 20 cp, preferably not higher than 5 cp.

Figure 2:
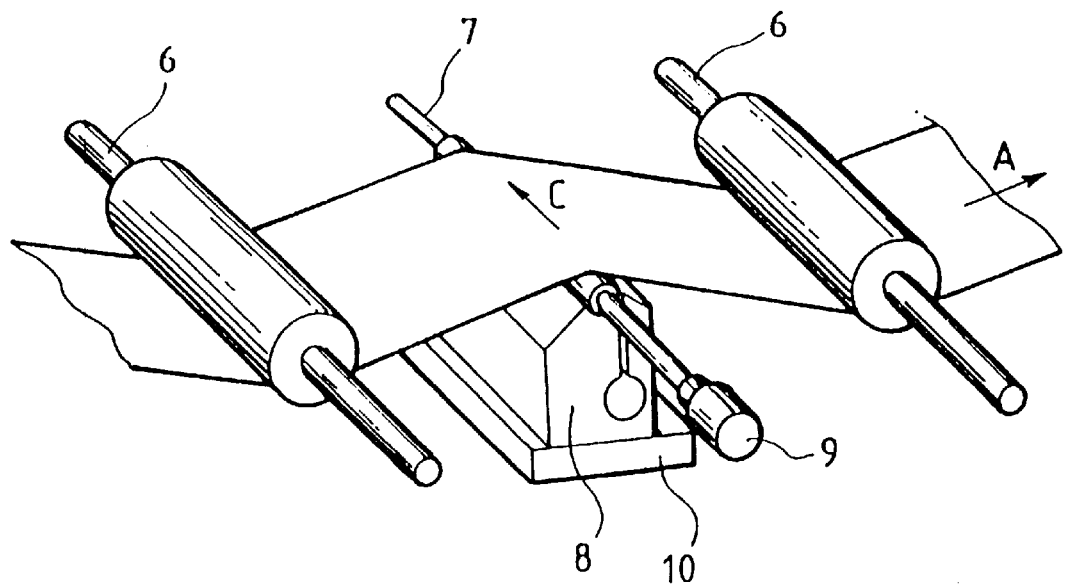
FIG. 2 is a perspective view of a dust removing apparatus in this embodiment of the present invention.
Figure 3:
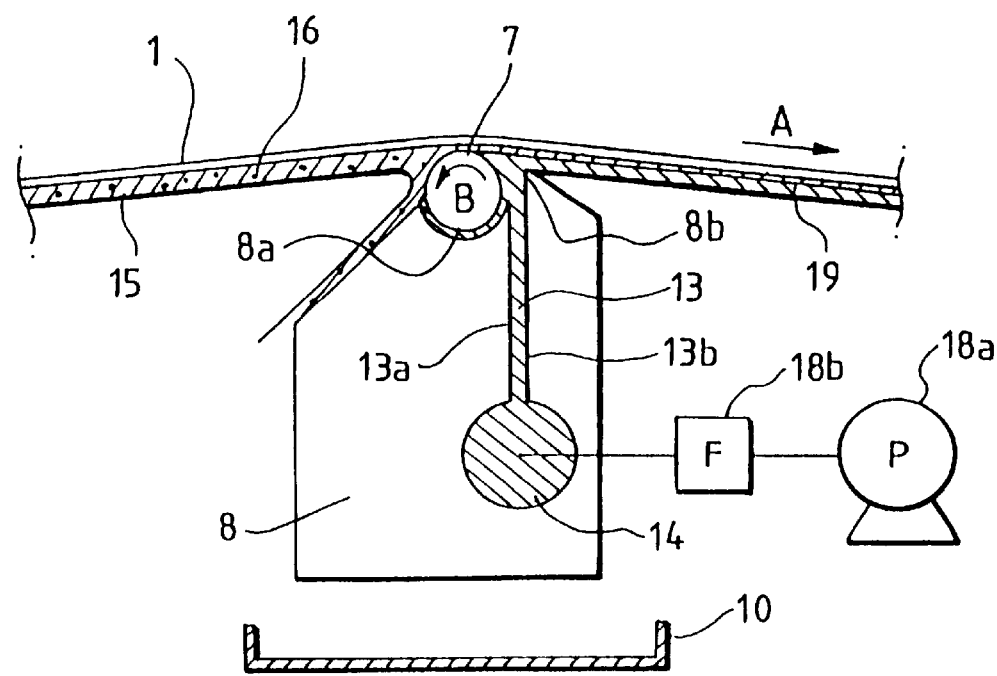
FIG. 3 is a sectional view of the dust removing apparatus in this embodiment of the present invention.

Referring to FIGS. 2 and 3, an apparatus and method for removing dust from the base film as an embodiment of the present invention will be described below in detail. FIG. 2 is a perspective view of a dust removing apparatus as an embodiment of the present invention, and FIG. 3 is a sectional view of the dust removing apparatus depicted in FIG. 2.

The rod member 7 which can touch, with a certain lap angle, one surface of the base film 1 conveyed between the guide rollers 6 and having dust to be removed, is disposed in a vertex portion of the dust removing apparatus 50 for removing dust from the base film 1 as an embodiment of the present invention. The rod member 7 has a diameter in a range of from 1 mm to 50 mm and has a surface at least formed from a cemented material (for example, WC-TAC) or a rigid material such as ceramics. The length of the surface of the rod member 7 is selected to be larger than the whole width of the base film 1. Further, the rod member 7 is configured such that the rod member 7 is kept rotatably by a block 8 having a width substantially equal to the surface length of the rod member 7, so that the rod member 7 can be rotated at a constant speed in a direction B reverse to the running direction A of the base film 1 by a rotation drive means such as a motor 9, or the like, connected to an end portion of the rod member 7. Generally, the rotational speed of the rod member 7 is selected to be in a range of from 10 rpm to 500 rpm. This is because a defect in quality may be caused by splashing at a higher rotational speed.

The precoater 4 for applying a cleaning solvent 15 onto the base film 1 is disposed in the upstream side of the rod member 7 in the direction of conveyance of the base film 1. As shown in FIG. 1, the precoater 4 is constituted by a cleaning solvent tank 11 for reserving the cleaning solvent 15, a pump 12a for pressing and sending the cleaning solvent 15, a filter 12b for filtering the pressed and sent cleaning solvent 15, and a multistageous syringe- needle-type nozzle 12c for jetting the filtered cleaning solvent 15 onto one surface of the base film 1.

A large part of the cleaning solvent 15 applied by the precoater 4 is scraped off together with deposits 16 in the upstream side of the rotating rod member 7. After the cleaning solvent 15 thus scraped off is recovered by a solution tray 10 disposed under the block 8, the cleaning solvent 15 is returned to the cleaning solvent tank 11. In this occasion, a small amount of the cleaning solvent 15 runs into the gap formed between the rod member 7 and the base film 1 so that a thin cleaning solvent layer 19 is formed on the one surface of the base film.

Further, a slit 13 is provided in the block 8 in the downstream side of the rod member 7 so as to extend in a direction C perpendicular to the running direction A of the base film 1. The slit 13 communicates a pocket portion 14 provided in the bottom portion of the block 8. The slit 13 is defined by two parallel surfaces 13a and 13b generally separated at a distance in a range of from 0.05 to 1 mm, preferably from 0.1 to 0.5 mm, more preferably from 0.2 to 0.3 mm. The pocket portion 14 has a substantially circular section of a diameter larger than the width of the slit 13. This is because if the slit is too narrow the pressure loss increases to make it necessary to use a large-sized pump and if the slit is too wide the flow rate in the slit drops so that it becomes impossible to form uniform solution film. A groove 8a having a semicircular section of a diameter substantially equal to the diameter of the rod member 7 is provided for supporting the rod member 7 in the upstream side of the block 8. Further, an edge 8b is provided in the block 8 in the downstream portion thereof.

That is, the block 8 has a structure in which a solvent of the same kind as the cleaning solvent 15 is pressed out of the cleaning solvent tank 11 by means of the pump 18a so that the solvent in a range of from 5 $cc/m^2$ to 15 $cc/m^2$ can be applied onto the base film 1, at the downstream side of the rod member 7, through the filter 18b, the pocket portion 14 and the slit 13 without interposition of any space.

Further, a known height adjuster not shown is provided in a guide roller 6 disposed in the downstream side of the rod member 7 so that the position in height of the guide roller 6 can be adjusted. Accordingly, the lap angle between the base film 1 and the rod member 7 or the gap between the base film 1 and the downstream side edge 8b of the block 8 can be adjusted suitably.

EXAMPLE

Figure 4:
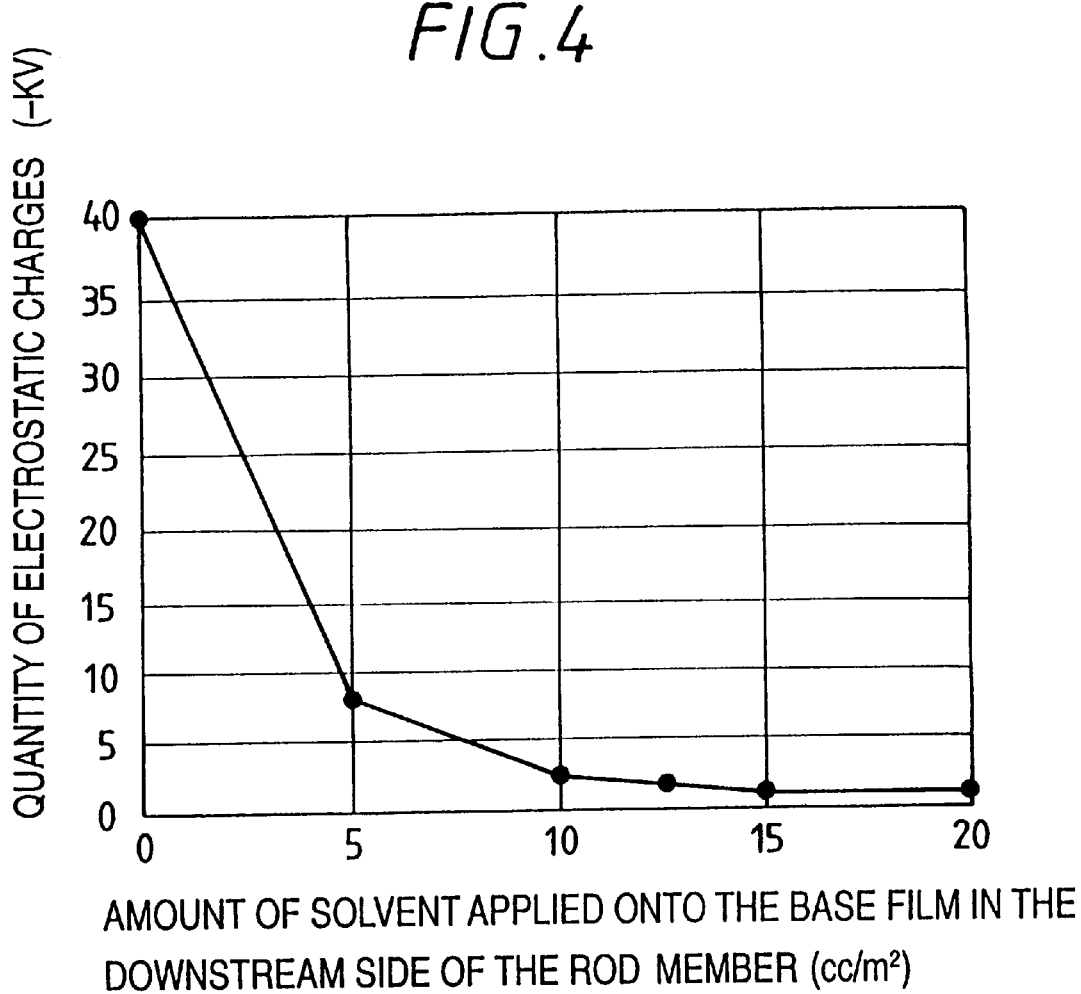
FIG. 4 is a graph showing results of an experiment using the dust removing method according to the present invention.

While a polyethylene terephthalate base film having a thickness of 60 μm and a width of 1000 mm was conveyed at a speed of 200 m/min, dust was removed from the base film by the rod member 7 as shown in FIG. 2 and then a solvent (methyl ethyl ketone) of the same kind as the cleaning solvent was applied onto the base film in the downstream side of the rod member 7. As the cleaning solvent, methyl ethyl ketone was used. The rod member, which was formed from a cemented material having a diameter of 3 mm and a surface roughness of Rmax 0.2 μm, was rotated at a constant rotational speed of 100 rpm in the direction reverse to the running direction of the base film. While the amount of the solvent applied onto the base film in the downstream side of the rod member 7 was changed in a range of from 0 $cc/m^2$ to 20 $cc/m^2$, the quantity of electrostatic charges of the base film was measured just after the base film passed the rod member 7. Results of the measurement are as shown in FIG. 4.

When 5 $cc/m^2$ or more of the solvent was applied onto the base film in the downstream side of the rod member 7, good results were obtained with respect to electrostatic charges. Even in the case where 150 $cc/m^2$ or more of the solvent was applied, the quantity of electrostatic charges was not changed so much. Accordingly, the amount of the solvent applied onto the base film in the downstream side of the rod member 7 is preferably not smaller than 5 $cc/m^2$ more preferably in a range of from 5 $cc/m^2$ to 15 $cc/m^2$.

Figure 5:
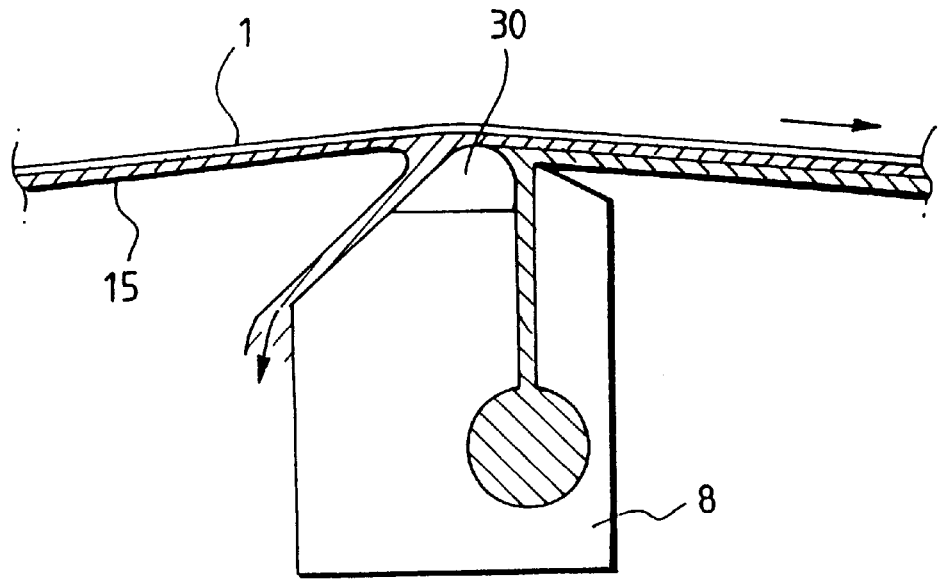
FIG. 5 is a sectional view showing another embodiment of the present invention.
Figure 6:
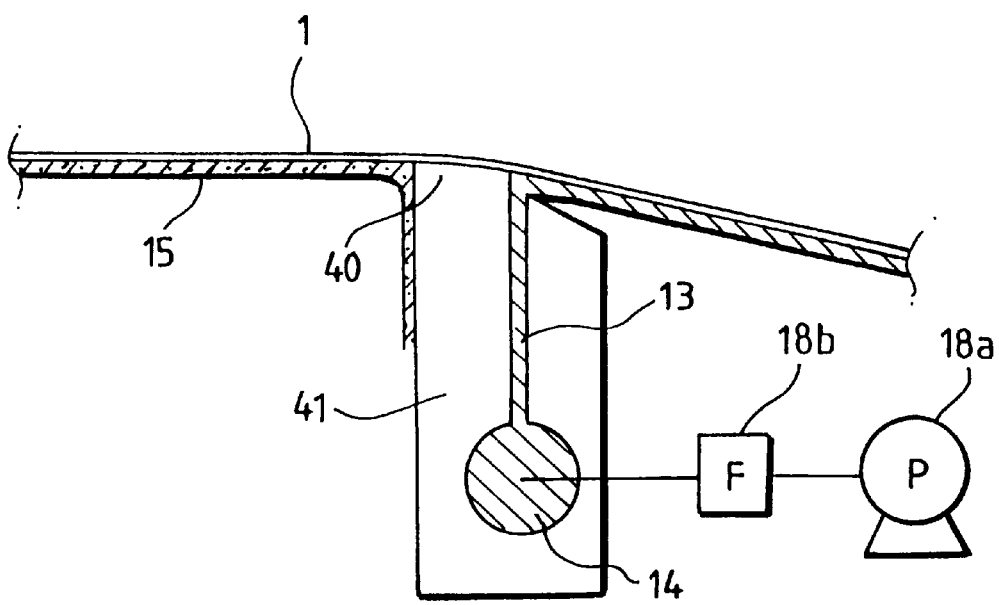
FIG. 6 is a sectional view showing a further embodiment of the present invention.

Although the dust removing apparatus has been shown as an example of the present invention, changes or modifications may be made suitably so long as the dust removing apparatus is of the type in which a large amount of the cleaning solvent applied by means of the precoater can be scraped off together with deposits. For example, even if the rod member 7 is replaced by a fixed curve member 30 according to another embodiment of the present invention as shown in FIG. 5 or replaced by a blade 41 having a sharp edge 40 according to a further embodiment of the present invention as shown in FIG. 6, the same effect as described above can be also obtained.

In the dust removing apparatus and method configured as described above according to the present invention, dust can be removed from the base film effectively so that electrostatic charges of the base film are reduced while the cleaning effect is kept high. Accordingly, high-density large-capacity recording media can be provided.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic recording medium producing process comprising the steps of:

applying a cleaning solvent onto one surface of a base film prior to application of any coating layer;

pressing a solvent scraping member against the one surface of said base film so as to separate and scrape deposits together with at least a portion of the solvent from the one surface of said base film; and applying a second solvent onto the one surface of said base film, said second solvent being of the same composition as said cleaning solvent, or being a mixture of a solvent of the same composition as said cleaning solvent and an additive mixed thereto, wherein an amount of the second solvent applied is in a range of from 5 $cc/m^2$ to 15 $cc/m^2$, and wherein the one surface of said base film and any remaining solvent are not exposed to an atmospheric air space between the time when said cleaning solvent and said deposits are scraped from said base film and the time when said second solvent is applied, to thereby prevent the base film from being electrostatically charged.

2. The magnetic recording medium producing process according to claim 1, in which an amount of the second solvent is not less than 10 $cc/m^2$.

* * * * *